US009722923B2

(12) United States Patent
Wen et al.

(10) Patent No.: US 9,722,923 B2
(45) Date of Patent: Aug. 1, 2017

(54) METHOD OPERATING IN A FIXED ACCESS NETWORK AND UES

(71) Applicant: Alcatel Lucent, Boulogne-Billancourt (FR)

(72) Inventors: Haibo Wen, Shanghai (CN); Zheng Liang, Shanghai (CN); Hui Ling, Shanghai (CN); Shuigen Yang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/428,479

(22) PCT Filed: Sep. 9, 2013

(86) PCT No.: PCT/IB2013/002217
§ 371 (c)(1),
(2) Date: Mar. 16, 2015

(87) PCT Pub. No.: WO2014/049432
PCT Pub. Date: Apr. 3, 2014

(65) Prior Publication Data
US 2015/0200849 A1    Jul. 16, 2015

(30) Foreign Application Priority Data
Sep. 29, 2012   (CN) .......................... 2012 1 0378577

(51) Int. Cl.
*H04L 12/741* (2013.01)
*H04L 12/46* (2006.01)
(Continued)

(52) U.S. Cl.
CPC .......... *H04L 45/74* (2013.01); *H04L 12/4641* (2013.01); *H04L 45/586* (2013.01); *H04L 63/08* (2013.01)

(58) Field of Classification Search
CPC ... H04L 45/74; H04L 45/586; H04L 12/4641; H04L 63/08
See application file for complete search history.

(56) References Cited

U.S. PATENT DOCUMENTS

2009/0180444 A1* 7/2009 McManus ............. H04W 36/30
370/332
2009/0181641 A1* 7/2009 Fiatal .................. H04M 3/4872
455/406

(Continued)

FOREIGN PATENT DOCUMENTS

CN        1392708 A     1/2003
CN        1874226 A     12/2006

(Continued)

OTHER PUBLICATIONS

International Search Report PCT/ISA/210 for International Application No. PCT/IB2013/002217 Dated Mar. 31, 2014.

(Continued)

*Primary Examiner* — Carl Colin
*Assistant Examiner* — Vance Little
(74) *Attorney, Agent, or Firm* — Harness, Dickey & Pierce, P.L.C.

(57) ABSTRACT

In a CN access network with a virtual node for at least one third party, the virtual node being used for bearing and operating the function defined by the third party, the UE accesses from a fixed access network; and the access network provides the UE with the communication connection between the UE and the virtual node of the third network/service operator. According to the embodiment the access network accommodates the virtual node to operate the function related to the third party, and improves the function topology architecture of the network, to provide users with better user experience quality.

9 Claims, 7 Drawing Sheets

(51) Int. Cl.
*H04L 12/713* (2013.01)
*H04L 29/06* (2006.01)

(56) References Cited

U.S. PATENT DOCUMENTS

| | | | | |
|---|---|---|---|---|
| 2010/0017861 A1* | 1/2010 | Krishnaswamy | ..... | H04W 48/18 |
| | | | | 726/7 |
| 2010/0306409 A1 | 12/2010 | Jansen et al. | | |
| 2011/0125905 A1* | 5/2011 | Baucke | ................ | H04M 15/00 |
| | | | | 709/226 |

FOREIGN PATENT DOCUMENTS

| | | |
|---|---|---|
| EP | 2434822 A1 | 3/2012 |
| WO | WO-2008082352 A1 | 7/2008 |
| WO | WO-2008111028 A2 | 9/2008 |
| WO | WO-2012041755 A1 | 4/2012 |
| WO | WO-2012103932 A1 | 8/2012 |

OTHER PUBLICATIONS

Written Opinion of the International Searching Authority PCT/ISA/237 for International Application No. PCT/IB2013/002217 dated Mar. 31, 2014.

\* cited by examiner

METHOD OPERATING IN A FIXED ACCESS NETWORK AND UES

This application is the national phase under 35 U.S.C. §371 of PCT International Application PCT/IB2013/002217 which has an International filing date of Sep. 9, 2013, which claims priority to Chinese patent application number CN 201210378577.7 filed Sep. 29, 2012; the entire contents of each of which are hereby incorporated by reference.

TECHNICAL FIELD

The invention relates to fixed access networks.

BACKGROUND OF THE ART

Network virtualization is a technical hotspot, and is also the development trend of future network. A physical network can be shared by multiple operators, which can increase the utilization rate of the network. There is some related work in access networks. E.g. the broadband forum (http://www.broadband-forum.org/) has defined a L2 wholesale mode and a L3 wholesale mode, which allows the operator of an access infrastructure network (AIN) (i.e. the operator of a fixed access network) to rent some bandwidth resources of the access network to the third part except users and the operator of the access infrastructure network, e.g. a virtual network operator and a service provider. Another example, the open light-wave initiator established in 2010 (http://www.openlambdainitiative.org/Website/Home.aspx) also describes an open architecture framework, which evolves from the existing closed network to an open service model, and arouses the attention of the emerging technology from the industry. "New or alternative operators need an unlimited way which make their own technical platform to obtain unrestricted access to the existing city access architecture, thereby, they can focus on the content service of end users, and the performance requirement of the data link layer, while will not repeat the construction of an access structure". The new or alternative operators referred herein are the virtual network operators mentioned above, and they need to rent physical access network resources to provide their own business/service to users.

SUMMARY OF THE INVENTION

Illustrated as FIG. 1, the operator of the existing access infrastructure network (i.e. a physical fixed access network) provides a logic connection between a virtual network operator (VNO, i.e. the third party network operator) and UEs of end users, and the access infrastructure network can guarantee the QoS communication characteristics, etc. of the connection. Other additional operation function of the service provided to users is in the virtual network operator (note that herein the service provided by the fixed access network operator is not considered, such as IPTV etc.), e.g. multicast source of video data, or the function of the user data inserting advertisement must be in the network controlled by the virtual network operator, even the communication between the UE m and the UE n accessing the same access network must be transferred between virtual network operators. This causes a lot of problems, e.g. for the multicast, the access network has to establish channels to transport the same video data between each UE and the virtual network operator, which consumes much bandwidth in the access network; another example, for the communication between the UE 1 and the UE 2 enjoying the service provided by the virtual operator B, its time delay is longer, which can not meet the time delay requirement of users communicating with each other in the service.

In order to address the above technical problems, in fact, for some applications, if the access infrastructure network can allow the virtual network operator to place the related logic function as close as possible to the user locations, it can provide better quality of user experience (QoE) for users. E.g. if the switch function of communication data between users is closer to the UE, it may achieve shorter communication delay to improve the user experience. Obviously, this is beneficial to the virtual network operator and users.

Based on this, the invention concept of the invention is adding a virtual node in the access network (e.g. an access infrastructure network AIN) for achieving the third party function, and the virtual node can handle/optimize the service related to the third party. And further, after the access network has the virtual node, the invention also provides an effective mechanism to guarantee that UEs can access the virtual node.

Based on the invention concept, according to the first aspect of the invention, a method operating in a fixed access network is provided, comprising the following steps:

i. providing in the access network a virtual node for at least one third party, the virtual node being used for bearing and operating the function defined by the third party;

iii. providing a communication connection between a UE and the virtual node, wherein, the UE accesses from the access network.

In this aspect, making the access network accommodate virtual nodes to operate the function related to the third party improves the function topology architecture of the network, and provides better quality of user experiences for users.

According to a preferred embodiment, the access network is a physical access network, and the third party is a virtual access network or a service provision network independent of the physical access network.

In the embodiment, virtual nodes may be provided for a virtual access network or a service provision network in a physical access network, which expands the functions of those third parties in a physical access network.

According to a preferred embodiment, the step i also allocates an address for the virtual node to identify the virtual node;

and the method further comprises a step of:

ii. informing the address to the UE;

then, the step iii provides the communication connection between the UE and the virtual node according to the address.

In the preferred embodiment, an address is further provided for the virtual node, and the communication connection is provided based on the address. This can allow a UE to access different virtual nodes respectively.

According to a further embodiment, the address is a media access control address, and the media access control address is specific for the virtual node.

The advantage of the embodiment is that: some layer 2 network elements without real MAC addresses, e.g. a physical access node (such as DSLAM) etc. can be provided the virtual MAC address, which makes they be addressable via the MAC addresses in the access network, thus the access network may provide virtual nodes in these layer 2 network elements, and establish the communication connection between them and UEs, which greatly increase the flexibility of deploying virtual nodes. And, using virtual MAC addresses also saves the last mile overhead between the access network and UEs to improve the data transmission efficiency.

According to a further embodiment, the step iii comprises:
routing uplink data sent by a UE, with a destination address of the data link layer being the media access control address, to the virtual node;
transmitting downlink data generated by the virtual node to the UE by taking the media access control address as the source address of the data link layer.

The embodiment provides a more detailed embodiment of establishing the communication connection between UEs and virtual nodes based on virtual MAC addresses.

According to a further embodiment, the method further comprises the following steps:
maintaining corresponding relation between the third party and the address of the virtual node, and maintaining the position where the virtual node locates in the access network;
and the step ii further comprises the following steps:
x. receiving identifications of one or more third parties to which access is requested, transmitted by the UE, and receiving the current physical access position information of the UE, inserted by an access node to which the UE accesses.
y. searching for the address of the virtual node corresponding to the third party, according to the identification of the third party to which the UE requests to access and the physical access position information, for each third party respectively;
z. transmitting the address of the virtual node corresponding to each third party to the UE.

In this embodiment, a suitable virtual node is provided to the UE according to the third party requested by the UE and the physical position to which the UE currently accesses, thus having strong flexibility and pertinence. And through the dynamic procedure of requesting and address transmitting, the UE is allowed to be able to implement request for different third parties, thus the UE is able to access different third parties at different time or at the same time.

According to a further embodiment, the step x comprises the following steps:
receiving in an access equipment an authentication request message from the UE, the authentication request message comprising the identification of the third party, and proof information of the UE;
the access equipment inserting the current physical access position information of the UE in the authentication request, and transmitting the obtained access request message to an authentication server;
the authentication server receiving the access request message, implementing the access authentication for the UE, and after the access authentication is successful, implementing the step y and the step z.

In the embodiment, the above-mentioned procedure of providing the addresses of virtual nodes is completed within the authentication process of the UE in the access network, which can use the current access authentication process and is very convenient.

According to a further embodiment, the access request is based on RADIUS protocol or DIAMETER protocol, and the step z comprises the following steps:
the authentication server transmitting the address to the access equipment in an access accepted message, wherein, any of the following is used for carrying the address:
specific attribute value pair, which is specifically used for carrying the address of virtual nodes;
sub-option value pairs in the vendor-specific attribute value pair;
the access equipment receiving the access accepted message, extracting the address from the access accepted message, and transmitting to the UE the address and information about access allowance in an authentication success message.

In the embodiment, using RADIUS protocol or DIAMETER protocol between the access equipment and the authentication server is proposed, and it improves attribute value pairs (AVP) in the protocol to carry addresses of virtual nodes, thereby having better compatibility.

According to a preferred embodiment, the step i provides the virtual node attached or directly located in the network element of the access network, and the network element comprises any of the following:
a physical access node (A-SN);
an edge node (E-SN); and
a server in the access network;
and, the virtual node comprises any of the following implementation:
the virtual node based on software implementation;
a specific hardware function board based on hardware implementation.

The embodiment provides preferred positions of virtual nodes, and provides the implementing mode of software or hardware, wherein, the flexibility of software mode implementing is higher; while the stability of hardware mode implementing is stronger.

According to a further embodiment, when the virtual node is implemented via a specific hardware function board, and is located in a network element, between the multiple hardware function boards and a line termination board (LT) there is:
an switch unit, connected with multiple line termination boards and the multiple hardware function boards, used for switching communication data between the corresponding UE and the virtual node between the line termination board and the hardware function board.

The embodiment provides a more detailed structure using multiple hardware function boards to implement a virtual node.

According to another aspect of the invention, a method operating in a UE is provided, comprising the following steps:
a. accessing from a fixed access network;
c. providing by the access network communication connection between the UE and a virtual node of the third party, in the access network, expected by the UE, wherein, space of the virtual node is used for bearing and operating the function defined by the third party.

The aspect provides the improvement of the invention to the UE.

According to a preferred embodiment, the step c comprises the following steps:
determining the third party corresponding to the upper application and protocol stack of the UE;
transmitting data frame of the upper application and the protocol stack to the access network by taking the address of the virtual node corresponding to the third party as the destination address;
and comprising the following steps:
receiving from the access network data frame with the address of the virtual node as the source address;

providing payload in the data frame to the protocol stack and the upper application corresponding to the third party to which the address of the virtual node corresponds.

The preferred embodiment provides a decision process in UEs, which can establish a seamless connection between the protocol stack and application of upper layers and the corresponding virtual nodes of the third party, and implements less modification to UEs.

These and other features of the embodiment of the invention will be described in the following detailed embodiment part, or are known by ordinary skilled in the field based on the following detailed embodiment.

BRIEF DESCRIPTION OF THE DRAWINGS

By reading the detailed description for unlimited embodiments by referring the following attached drawings, other features, purposes and advantages of the invention will be clearer.

DETAILED EMBODIMENT

According to an aspect of the invention, a method operating in a fixed access network is provided, comprising the following steps:

i. providing in the access network a virtual node for at least one third party, the virtual node being used for bearing and operating the function defined by the third party;

iii. providing a communication connection between a UE and the virtual node, wherein, the UE accesses from the access network.

For the UE side, a method operating in a UE is provided, comprising the following steps:

a. accessing from a fixed access network;

c. providing by the access network communication connection between the UE and a virtual node of the third party, in the access network, expected by the UE, wherein, space of the virtual node is used for bearing and operating the function defined by the third party.

The following will describe the invention in detail from the aspects of the network architecture, the implementing mode of virtual nodes, the identification mode of virtual nodes etc., finally will show the whole process of establishing an communication connection with a virtual node during the UE's access to the access network.

1. Network Architecture

Figure 1:
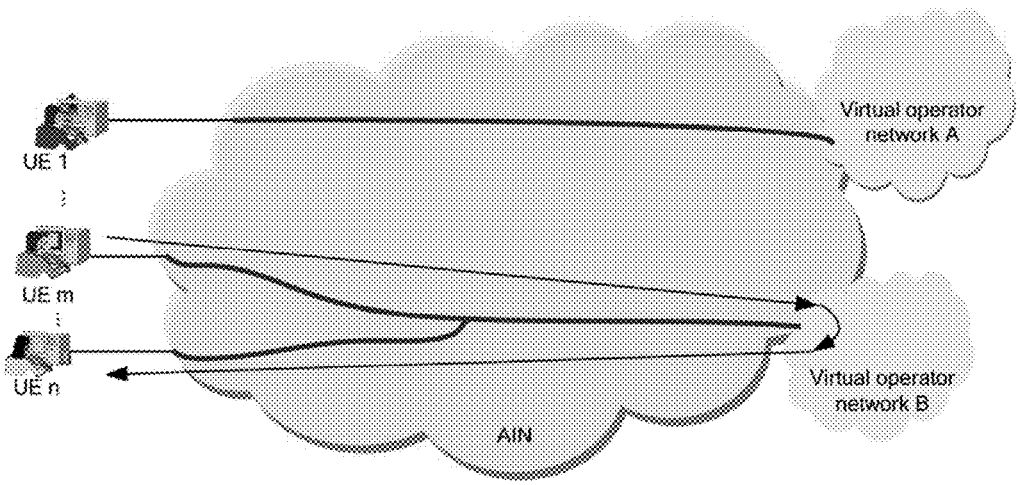
FIG. 1 is the logic relationship diagram of UEs, an access infrastructure network and network operators.
Figure 2:
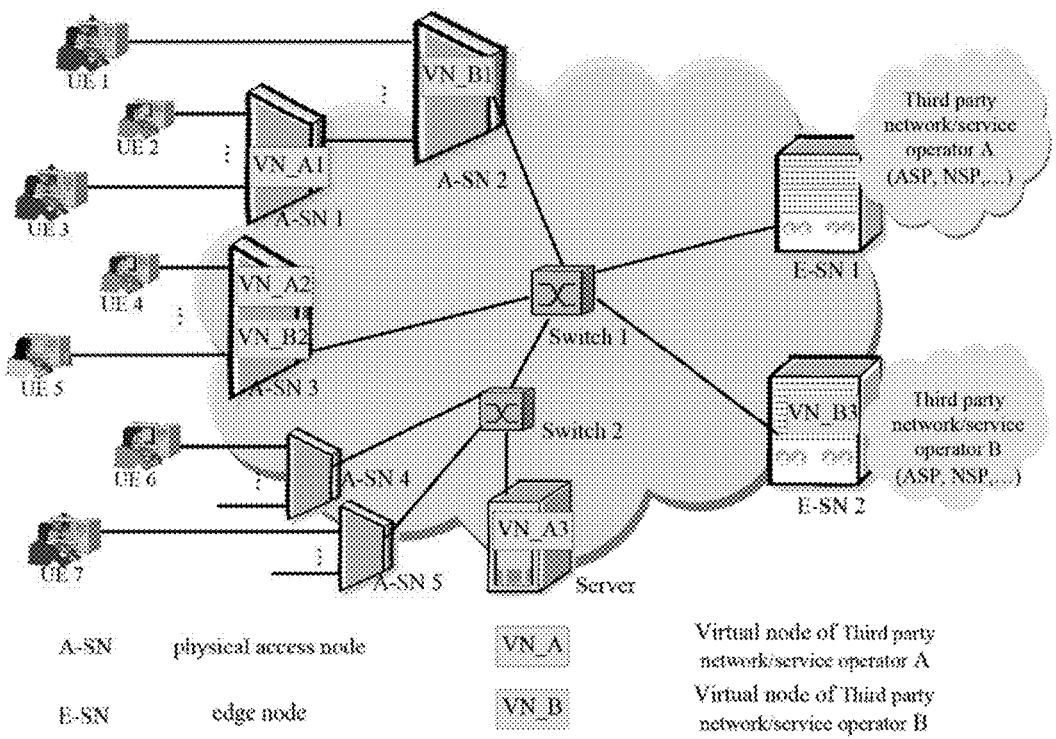
FIG. 2 shows the diagram of an access infrastructure network with virtual nodes, according to the embodiment of the invention.

FIG. 2 shows the diagram of an access infrastructure network with virtual nodes. Wherein, the virtual nodes of the network/service operator A and B of the third party are VN_Ax, VN_Bx, and they can be implemented in the physical access node A-SN x or the edge node E-SN x, or a server in the access network, wherein, x is 1, 2, or 3. The physical access node A-SN is for example a DSLAM with the capability of providing virtual nodes, the server may be implemented by a server cluster, such as a computing cloud of the access infrastructure network.

In FIG. 2, the access infrastructure network provides three virtual nodes for the network/service operator A of the third party, which are the virtual nodes VN_A1, VN_A2 and VN_A3 respectively, and they are located in the physical access node A-SN 1, A-SN 3 and the server respectively.

The access infrastructure network provides three virtual nodes for the network/service operator B of the third party, which are the virtual nodes VN_B1, VN_B2 and VN_B3 respectively, and they are located in the physical access node A-SN 2, A-SN 3 and the edge node E-SN 2.

It should be understood that, the network topology architecture and the position of the virtual node shown as FIG. 2 is only an illustrated example. Generally, in order to save virtual nodes, when deploying virtual nodes, it is preferably to set them in the trunk in the topology architecture of the access network, which makes as many as possible UEs be able to access the virtual node. E.g. in FIG. 2, the virtual node VN_B1 of the network/service operator B2 of the third party is set in the physical access node A-SN 2, thus all of the UE 1, UE 2, and UE 3 can access. Certainly the virtual nodes needed by the network/service operator of the third party can be implemented in a suitable physical network element, according to the requirement of the network/service operator of the third party and some optimization principle of the physical network operator themselves.

2. Implementing Mode of Virtual Nodes

In a preferred embodiment, the step i provides that the virtual node is attached or directly in the network element of the access network.

Figure 3:
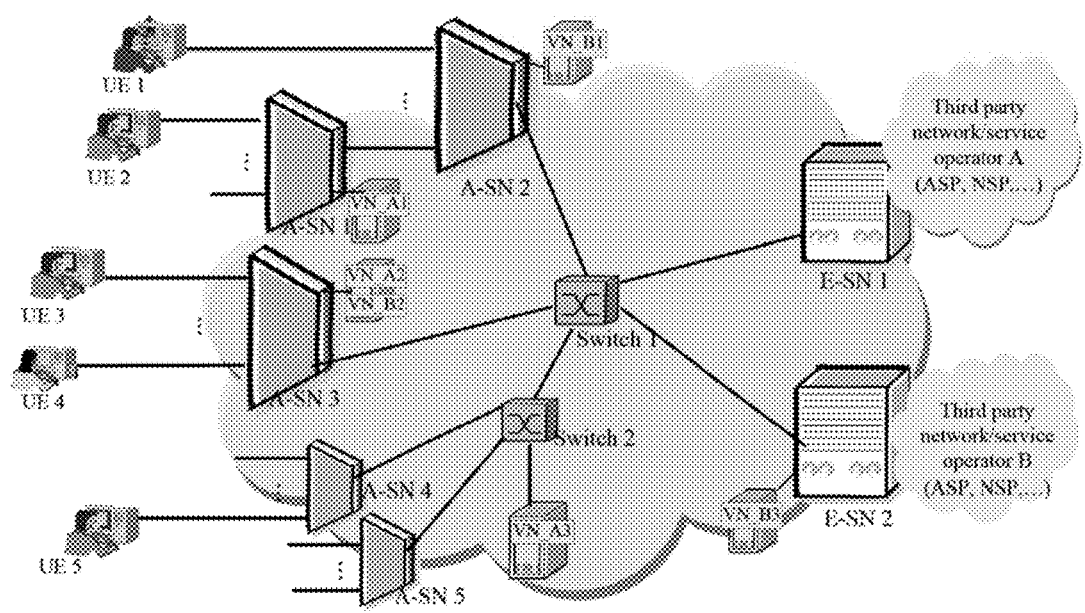
FIG. 3 shows the diagram showing that virtual nodes are attaching to network elements in an access infrastructure network according to the embodiment of the invention.

A solution is to provide an additional equipment connecting with the network element A-SN or E-SN, and implement the needed virtual node in the equipment. Illustrated as FIG. 3, the equipment with certain computing and processing capability can be connected with A-SN or E-SN. This solution implements less modification to the network element of the existing access network, and is easy to upgrade the existing access network.

Another solution is to upgrade A-SN or E-SN, by adding the virtual node into the network element.

For the above two solutions, in a preferred embodiment, the virtual node can comprise any of the following implementation:

the virtual node based on software implementation;

a specific hardware function board based on hardware implementation.

Figure 4:
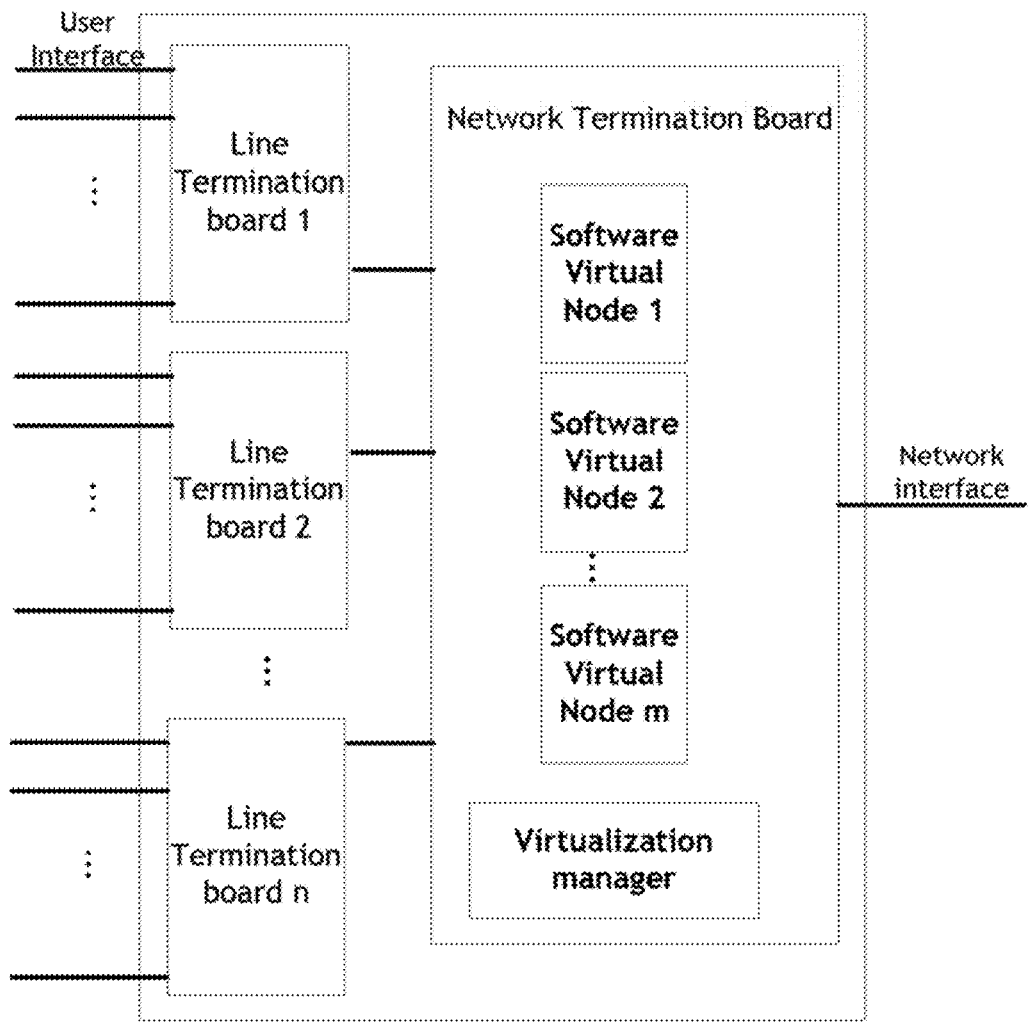
FIG. 4 shows the block diagram of implementing virtual nodes with software mode according to the embodiment of the invention.

Specially, for the solution using software implementing, when adding a virtual node into A-SN directly, the architecture shown as FIG. 4 may be provided. Wherein, A-SN comprises a line termination board connecting with a UE or a subordinate A-SN, also comprises a network termination board connecting with the superior network. In the network termination board, a software environment is provided, wherein, each virtual node is implemented by a software virtual node, such as a virtual machine And, each virtual machine is isolated with each other in function. Illustrated as FIG. 4, the network termination board also comprises a virtualized manager used for managing each virtual node. In one case, when the computing and processing capability of A-SN is strong enough, each software virtual machine may be installed and operated in A-SN. In one case, if a stronger function is needed, the A-SN may be defined with a new specification and stronger computing and processing capability.

Figure 5:
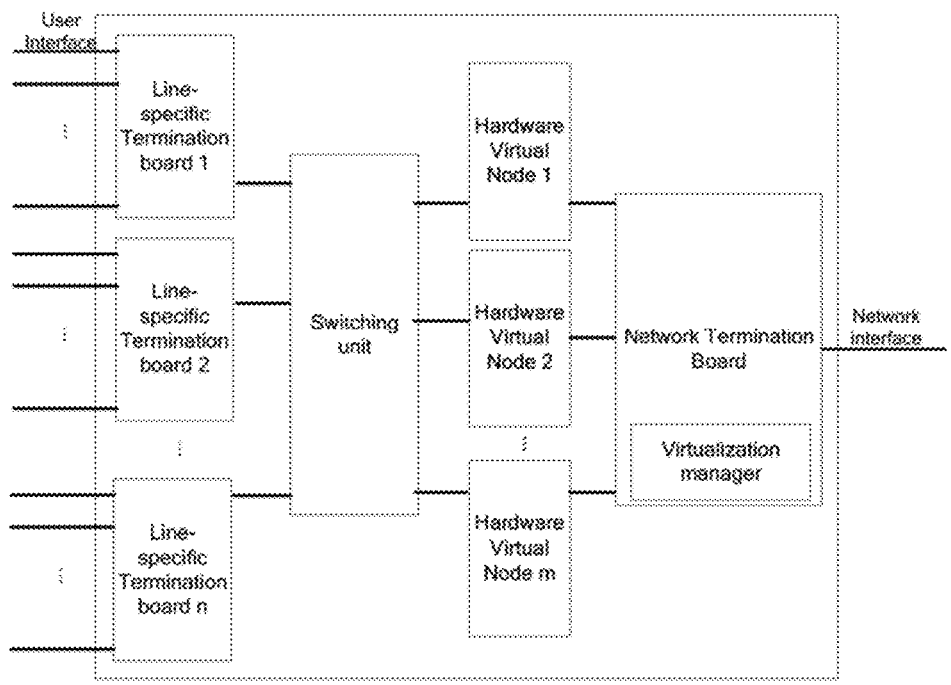
FIG. 5 shows the block diagram of implementing virtual nodes with hardware mode according to the embodiment of the invention.

While for the solution using hardware implementing, when adding a virtual node into A-SN directly, the architecture shown as FIG. 5 may be provided. Wherein, A-SN comprises a line termination board connecting with a UE or a subordinate A-SN. A-SN also comprises multiple specific hardware function boards implemented by hardware, and these hardware function boards are corresponding to the virtual node 1, 2, . . . and m respectively. Between the multiple hardware function boards and a line termination board (LT) there is a switch unit which is used for switching communication data between the corresponding UE and the virtual node between the line termination board and the hardware function board. Each hardware function board is connected to a network termination board, the network termination board provides the network interface from the A-SN to a superior network element. Illustrated as FIG. 5, the network termination board also comprises a virtualized manager used for managing each virtual node. The advantage of using hardware function board to implement virtual nodes is that: each hardware function board will not affect each other, and all can work reliably, and some of the function boards may be switched off to save energy when it is not needed.

3. Identification Mode of a Virtual Node

Preferably, a network should provide such flexibility to UEs: in one time connecting a virtual node of one virtual network operator, in another time connecting a virtual node of another virtual network operator, and in the same time connecting different virtual nodes of different virtual network operators. In order to provide the function, the embodiment of the invention also allocates an address for the virtual node to identify the virtual node.

Figure 6:
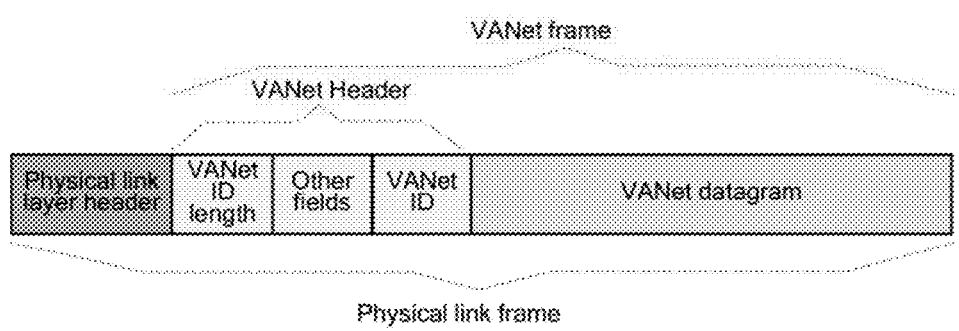
FIG. 6 shows the frame format of a physical link frame with a virtual access network header according to an embodiment of the invention, wherein the VANet-ID of the virtual access network header is as the address of a virtual node.

In a specific implementing mode, shown as FIG. 6, the invention proposes a header of a virtual access network (VANet). The header is attached after the header of a physical link layer, and before the message of the virtual access network. Wherein, the header of the virtual access network includes the identification of the virtual access network (VANet ID), which can be as the address of the virtual node to indicate a third party network/service operator. The header also includes the length of the VANet ID and other fields.

For this implementing mode, since the header of the physical link layer needs to be filled with the MAC address of the receiver, to facilitate the network to implement routing, a more suitable scenario of the implementing mode is: the virtual node is located in a network element with a real MAC address, such as the virtual node is located in a switch or E-SN. However, before the service of the third party network/service operator, there's not only a header of the virtual access network but also a MAC address package of the data link layer, therefore the transmission efficiency is low.

In another specific implementing mode, the service corresponding to a certain third party network/service operator can be marked with a corresponding VLAN tag, the VLAN tag indicating the third party network/service operator. In this mode, as similar as the former mode, the physical link frame needs the real MAC address of a receiver, thus a more suitable scenario of the implementing mode is: the virtual node is located in a network element with a real MAC address. However, before the service of the third party network/service operator, there is not only a VLAN tag but also a MAC address package of the data link layer, therefore the transmission efficiency is low.

In a preferred implementing mode, the invention proposes that, using a media access control (MAC) address as the address of a virtual node. The MAC address is specific to the virtual node, which may be called as a virtual MAC address.

When an access network operator provides virtual nodes to the third party network/service operator, it should consider in which network element a virtual node should be deployed. And, the access network operator also allocates a virtual MAC address for each virtual node, the virtual node communicates with a UE directly and logically by using this MAC address.

Since an access infrastructure network is a layer 2 network, it can appoint a virtual MAC address for each virtual node implemented in the virtual architecture network. The service transmitted from a UE to a certain virtual node can use the MAC address of the virtual node as the destination address of the data link layer, and the service can be accurately transmitted to the virtual node. It may be understood that, the virtual MAC address doesn't conflict with the real MAC address the network element in which the virtual node is located may have.

Figure 7:
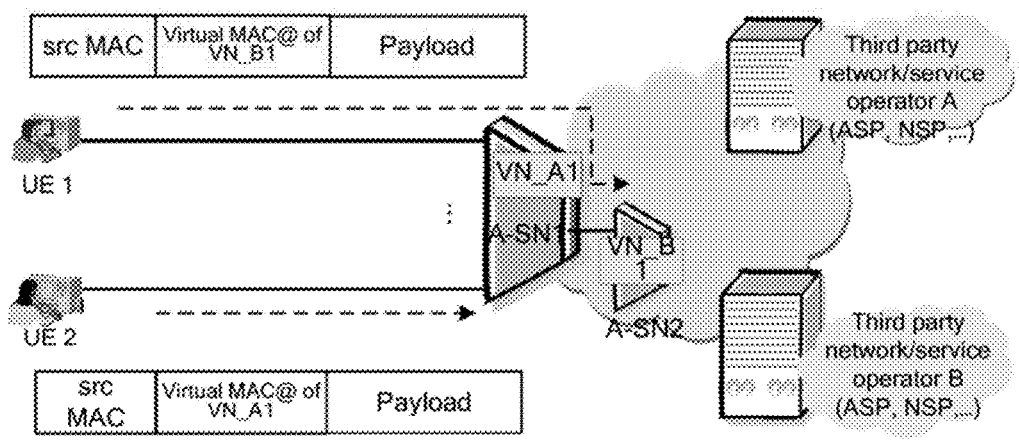
FIG. 7 shows the diagram of establishing a communication connection between UEs and virtual nodes using virtual MAC addresses, according to another embodiment of the invention.

Illustrated as FIG. 7, the UE 1 packages the payload transmitted to the third party network/service operator B in an ordinary Ethernet frame, and takes the virtual MAC address of the node VN_B1 of the third party network/service operator B as the destination address of the Ethernet frame. Illustrated as the topology architecture of FIG. 7, the UE 1 transmits the Ethernet frame to A-SN1, A-SN1 extracts the virtual MAC address, comparing its MAC address learning table, and knows that: the (virtual) node of the virtual MAC address is located in a certain port of its network side, therefore A-SN1 transmits the Ethernet frame to A-SN2. After A-SN2 receives the Ethernet frame, it extracts the virtual MAC address, and knows that the virtual node corresponding to the virtual MAC address is located in the local, thus, the virtual node VN_B1 in A-SN2 handles the payload in the frame. Wherein, the src MAC in the Ethernet frame identifies the source MAC address of the Ethernet frame, i.e. the MAC address of the UE 1. Wherein, during the communicating between the UE and the virtual node of the virtual MAC address, when the data frame with a virtual MAC address, transmitted by a virtual node, passes the A-SN1, the A-SN1 bounds the arriving port of the data frame with the virtual MAC address, thus obtains the corresponding table items in the above MAC address learning table. It may be understood that, the MAC address learning is a well-known process in the field, which will not be unnecessarily described herein.

Similarly, for the UE 2, it packages the payload transmitted to the third party network/service operator A in an ordinary Ethernet frame, and takes the virtual MAC address of the node VN_A1 of the third party network/service operator A as the destination address of the Ethernet frame. The UE 1 transmits the Ethernet frame to A-SN1. After A-SN1 receives the Ethernet frame, it extracts the virtual MAC address, and knows that the virtual node corresponding to the virtual MAC address is located in the local, thus, the virtual node VN_A1 in A-SN1 handles the payload in the frame. Wherein, the src MAC in the Ethernet frame identifies the source MAC address of the Ethernet frame, i.e. the MAC address of the UE 2.

In an embodiment, the access network maintains the corresponding relationship of the third party network/service operator and the virtual MAC address of the virtual node of the third party network/service operator, and it also maintains the position in which the virtual node is located. E.g. an AAA server of an access network records such data items in a data table:
<the third party network/service operator, the position in which the virtual node of the third party network/service operator is located, the virtual MAC address of the virtual node>

An example data table is shown as the following table 1:

TABLE 1

| Virtual network operator | position | the virtual MAC address of the virtual node |
|---|---|---|
| VNO A | A-SN1 | VN_A1 |
| VNO A | A-SN2 | VN_A2 |
| VNO B | A-SN1 | VN_B1 |
| ... | ... | ... |

The table is used by AAA server in searching, to obtain the virtual MAC address of a virtual node suitable for a UE, the process will be described in detail in the following embodiment.

It may be understood that, the access network informs the virtual MAC address of the access node to the network element in which the virtual node is located.

4. Using Attribute Value Pairs to Carry the Virtual MAC Address

Figure 8:
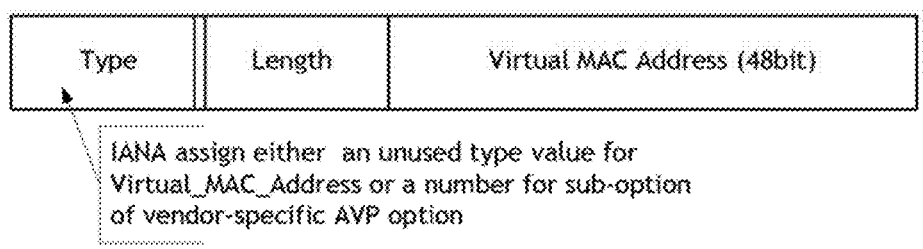
FIG. 8 shows the format of attribute value pairs carrying the virtual MAC addresses, according to an embodiment of the invention.

In a preferred embodiment, AAA server provides the virtual MAC address to a UE during the authentication process via A-SN implemented by the UE. In this process, AAA server needs to interact with A-SN, and AAA server needs to transmit the virtual MAC address to A-SN. In a preferred embodiment, A-SN is implementing authentication based on RADIUS protocol. The invention proposes using attribute value pairs (AVP) in RADIUS protocol to carry the virtual MAC address. More specifically, shown as FIG. 8, a new specific attribute pair can be defined, which is specifically used for carrying the address of virtual nodes; or, the sub-option value pairs in the vendor-specific attribute value pair can be used. The process will be described in detail in the following.

5. Implementing a Determining Process on the UE Side

A user terminal may access to different third party operators in the same time, and the UE should accommodate applications and protocol stacks corresponding to these different third party networks/service operators, which are the specific applications and protocol stacks used and defined by virtual network operators. In order to route the service of these upper applications and protocol stacks to the virtual node of corresponding third party network/service operator seamlessly, the invention adds a determining process on the UE side. In the transmitting direction, firstly, determining the third party network/service operator corresponding to the upper application and protocol stack of the UE; then, transmitting the data frame of the upper application and protocol stack to the access network, by taking the address of the virtual node corresponding to the third party network/service operator as a destination address. In the receiving direction, first receiving from the access network the data frame with the address of the virtual node as a source address; next, providing the payload in the data frame to the protocol stack and the upper application corresponding to the third party to which the address of the virtual node corresponds.

Figure 9:
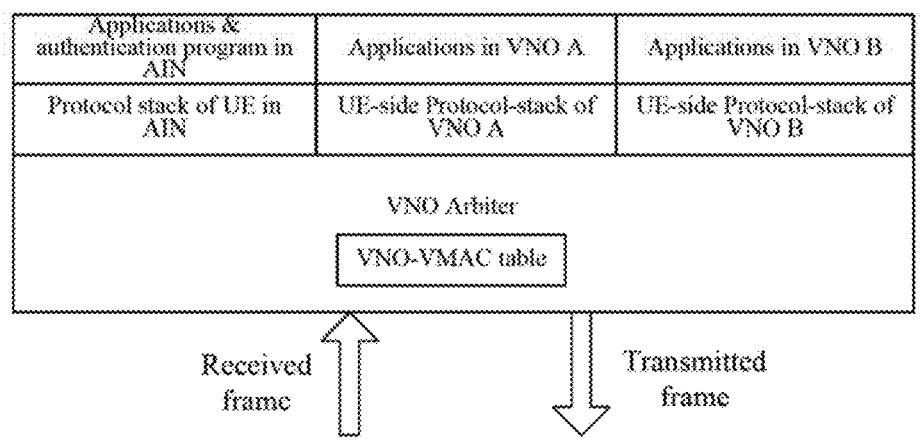
FIG. 9 shows the diagram of VNO arbiter, the application and protocol stack in a UE, according to an embodiment of the invention.

Specifically, shown as FIG. 9, a VNO arbiter is used. The VNO arbiter maintains the corresponding relationship between each VNO and the virtual MAC address (VMAC@) of a virtual node, or directly maintains the corresponding relationship between the upper application and protocol stack and the virtual MAC address (VMAC@) of a virtual node.

In the transmitting direction, the VNO arbiter takes the virtual MAC address of the virtual node of the third party network/service operator as the destination address of the data link layer to transmit the data of the application and protocol stack, according to the third party network/service operator corresponding to the application and protocol stack. Certainly, if an application and a protocol stack are not transmitted to the virtual node, e.g. if the application and protocol stack are corresponding to the physical access network, the UE will use the real MAC address of the network element in the physical access network as the destination address of the data link layer.

In the receiving direction, the VNO arbiter forwards the payload in the coming Ethernet frame to the protocol stack and upper application of the third party network/service operator of the corresponding virtual node to which the virtual MAC address corresponds, based on the virtual source MAC address in the frame.

Through the above embodiments, the user terminal may receive different third party operators in the same time, e.g. different applications in a terminal are corresponding to different virtual operators. The VNO arbiter in the terminal helps the data stream to be accurately sorted and transmitted.

6. The Process of the UE Implementing Access, Authentication and Establishing a Communication Link with a Virtual Node Preferably, the user terminal should be provided with the capability of dynamically connecting to different third party networks/service operators, e.g. connecting to different virtual network operators to implement different services, thus a mechanism is needed to dynamically connect the UE to the virtual node of the expected third party network/service operator. On the basis of the disclosed solution of identifying and addressing virtual node in the invention, the invention further proposes the process of the access network's informing the address of the virtual node to the UE.

Figure 10:
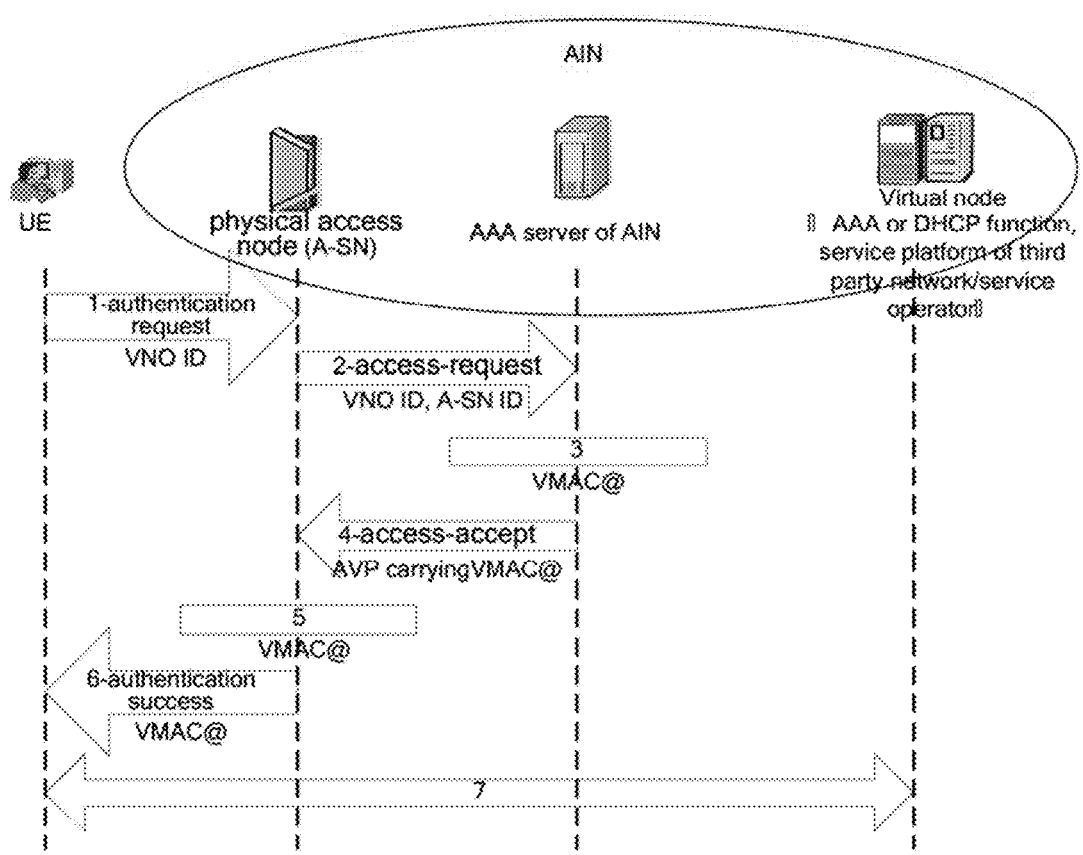
FIG. 10 shows the flow chart of providing the address of a virtual node in the access authentication process, according to an embodiment of the invention.

Illustrated as FIG. 10, in a preferred embodiment, the process is implemented together with the access authentication process of the UE in the access network, and the information of the third party network/service operator and the address of the virtual node is piggybacked by the signaling message in the access and authentication process, e.g. the virtual MAC address described by the attribute value pair is inserted in the access-accept message by AAA server and transmitted to A-SN, and next the virtual MAC address is inserted in the authentication success message by A-SN and transmitted to the UE.

Referring to FIG. 10, the following will describe in detail each step of the process of access, authentication and obtaining the virtual MAC address.

(1) The UE transmits an authentication request message via for example 802.1x, to implement the access authentication process with the access infrastructure network. Wherein, the authentication request message includes the proof information of the UE (the user) and NAI (e.g. user name: key@ domain name). And, the authentication request message also includes the identification of the third party network/service operator needed to be accessed, e.g. the ID of a virtual network operator (VNO ID).

(2) The physical access node (A-SN) receives the authentication request message, and transmits an access-request message to AAA server of the access network. The message includes the proof information of the user, NAI, and also includes a VNO ID. Besides, the physical access node (A-SN) further transmits the current physical access position information of the UE to AAA server. The current physical access position information of the UE includes the A-SN ID of this physical access equipment and the physical port connected to the UE.

(3) AAA server receives the access request message, and implements access authentication according to the proof information of the user, NAI etc. if the authentication is passed, AAA server will select a suitable virtual node corresponding to the VNO for the UE, according to the VNO ID requested by the UE. Preferably, AAA server also selects a suitable virtual node by referring to the current physical access position information of the UE. In one case, the selection is obtained by implementing comparing and searching in the table 1, firstly it searches the VNO to which the UE needs to access, then selects the nearest virtual node away from the UE in the virtual nodes corresponding to the VNO (e.g. selecting the nearest virtual node away from the physical access position of the UE). AAA server obtains the virtual MAC address of the selected virtual node (VMAC@).

(4) AAA server uses the above-mentioned AVP to accommodate the VMAC@, and transmits the AVP to A-SN in an access-accept message.

(5) The physical access node A-SN receives the access-accept message, and extracts the address therefrom. The physical access node A-SN also establishes an authentication success message which includes this virtual MAC address.

(6) The physical access node A-SN transmits an authentication success message to the UE. The UE can extract the address of the virtual node of the third network/service operator requested to be accessed from the authentication success message. At this time, logically, the UE already directly faces the virtual node.

(7) The UE communicates with the virtual node, and implements the necessary operations, such as implementing the authentication process with the third network/service operator to obtain the service it requests.

By using the above processes, the UE can access respectively each virtual node of multiple third networks/service operators. It's beneficial that multiple third networks/service operators share the access infrastructure network to provide value-added service for the UE.

In an improved embodiment, the UE requests to access multiple third networks/service operators at the same time. In the case, the UE includes multiple VNO IDs in the authentication request message. The physical access node A-SN inserts multiple VNO IDs in the access request and transmits to AAA server. AAA server inserts multiple attribute value pairs in the access accept message and provides to the physical access node, and each attribute value pair accommodates a VMAC@ of the virtual node of the third network/service operator. Finally, in the authentication success message, the physical access node transmits the virtual MAC address of each virtual node of multiple third networks/service operators to the UE by correlating the third network/service operator with the virtual MAC address, e.g. via the form of multiple <VNO ID, VMAC@> table items.

In the above process, RADIUS protocol is used to implement access authentication between the physical access node A-SN and AAA server, thus AAA server uses the AVP to carry the virtual MAC address. It may be understood that, it may use DIAMETER protocol to implement access authentication between the physical access node A-SN and AAA server, and in the case, the ordinary skilled in the field are easy to modify the above embodiment to adapt it for DIAMETER protocol. And the detailed modification will not be described herein.

In the above embodiment, the process that the access network provides the address of the virtual node of the third network/service operator to the UE is implemented in the process of the access authentication of the UE, and the related information, e.g. the identification of the third network/service operator, the address of the virtual node is piggybacked in the signaling of the access authentication process. It may be understood that, the process that the access network provides the address of the virtual node of the third network/service operator to the UE may also be an independent process, and the ordinary skilled in the field can design the corresponding signaling between the UE-the physical access node-AAA server and the signaling interaction to implement the above process, and the invention will not give unnecessary description.

It needs to be explained that, in the case of non-conflict, the embodiments and the features in the embodiments in the application may be combined with each other in any manner.

Certainly, there are other various embodiments of the invention, and without departing from the spirit and essence of the invention, the skilled familiar with the field may make all kinds of corresponding changes and modifications according to the invention, while these corresponding changes and modifications should fall in the scope of the claims appended in the invention.

What is claimed is:

1. A method of operating in a fixed access network, the method comprising: providing, in the fixed access network, a virtual node for a respective third party of a plurality of third parties, the virtual node used for bearing and operating a function defined by the respective third party; allocating an address to the virtual node such that the virtual node is identified by the address; informing a user equipment (UE) of the address; and providing a communication connection between the UE and the virtual node according to the address; receiving an identification of one or more third parties to which access is requested by the UE; receiving current physical access position information of the UE, the current physical access position information inserted by an access node that is accessed by the UE; searching for the address of the virtual node corresponding to the respective third party of the plurality of third parties based on (i) the identification of the one or more third parties to which the UE requests access, and (ii) the current physical access position information of the UE; and transmitting, to the UE, the address of the virtual node corresponding to the respective third party, wherein the address is a media access control address, the media access control address is specific to the virtual node, the fixed access network is a physical access network, the respective third party is at least one of a virtual access network and a service provision network, and the respective third party is independent of the physical access network.

2. The method of claim 1, wherein the providing of the communication connection comprises:
routing uplink data sent by the UE to the virtual node, the uplink data including a destination address of a data link layer, the destination address being the media access control address; and
transmitting downlink data generated by the virtual node to the UE by taking the media access control address as a source address of the data link layer.

3. The method of claim 1, further comprising:
maintaining a corresponding relation between the respective third party and the address of the virtual node; and
maintaining a position of the virtual node in the fixed access network.

4. The method of claim 3, wherein the receiving the identification comprises:
receiving, at an access equipment, an authentication request message from the UE, the authentication request message including (i) the identification of the one or more third parties, and (ii) proof information of the UE;
inserting, by the access equipment, the current physical access position information of the UE in the authentication request message;
transmitting the authentication request message to an authentication server;
receiving, at the authentication server, the authentication request message;
implementing access authentication for the UE; and
after the access authentication is successful, implementing the searching for the address of the virtual node and the transmitting the address of the virtual node to the UE.

5. The method of claim 4, wherein
the authentication request message is based on at least one of RADIUS protocol and DIAMETER protocol; and
the transmitting the address of the virtual node further includes,
transmitting the address by the authentication server to the access equipment in an access accepted message, the address carried by at least one of (i) a specific attribute value pair, and (ii) a sub-option value pair in a vendor-specific attribute value pair,
receiving the access accepted message at the access equipment,
extracting the address from the access accepted message, and
transmitting, to the UE, the address and information about access allowance in an authentication success message.

6. The method of claim 1, wherein
the providing provides the virtual node which is attached or located in a network element of the fixed access network;
the network element includes at least one of
a physical access node (A-SN),
an edge node (E-SN), and
a server in the fixed access network; and
the virtual node includes at least one of
the virtual node based on software implementation, and
a specific hardware function board based on hardware implementation.

7. A method of operating in a fixed access network, the method comprising:
providing, in the fixed access network, a virtual node for a respective third party of a plurality of third parties, the virtual node used for bearing and operating a function defined by the respective third party, the virtual node implemented via a specific hardware function board and located in a network element of the fixed access network, between multiple hardware function boards and a line termination board (LT);
allocating an address to the virtual node such that the virtual node is identified by the address;
informing a user equipment (UE) of the address;
providing a communication connection between the UE and the virtual node according to the address; and
switching communication data between a respective one of a plurality of UEs and the virtual node between the line termination board and the multiple hardware function boards using a switch unit, wherein
the network element includes at least one of a physical access node (A-SN), an edge node (E-SN), and a server in the fixed access network,
the address is a media access control address,
the media access control address is specific to the virtual node,
the fixed access network is a physical access network,
the respective third party is at least one of a virtual access network and a service provision network, and
the respective third party is independent of the physical access network.

8. A method of operating a user equipment (UE), the method comprising:
receiving, from a fixed access network, an address allocated to a virtual node such that the virtual node is identified by the address;
providing a communication connection between the UE and the virtual node in the fixed access network according to the address, the virtual node corresponding to a respective third party of a plurality of third parties, and the virtual node used for bearing and operating a function defined by the respective third party;
transmitting, to the fixed access network, identification of one or more third parties to which the UE requests access;
transmitting an authentication request message to the fixed access network, the authentication request message including (i) the identification of the one or more third parties, and (ii) access proof information of the UE; and
receiving an authentication success message from the fixed access network, the authentication success message including the address and information about access allowance, wherein
the address is a media access control address,
the media access control address is specific to the virtual node,
the fixed access network is a physical access network,
the respective third party is at least one of a virtual access network and a service provision network,
the respective third party is independent of the physical access network, and
the address of the virtual node corresponds to the respective third party.

9. A method of operating a user equipment (UE), the method comprising:

receiving, from a fixed access network, an address allocated to a virtual node such that the virtual node is identified by the address;

providing a communication connection between the UE and the virtual node in the fixed access network according to the address, the virtual node corresponding to a respective third party of a plurality of third parties, and the virtual node used for bearing and operating a function defined by the respective third party, the providing the communication connection including
- determining the respective third party according to an upper application and a protocol stack of the UE, and
- transmitting a data frame of the upper application and the protocol stack to the fixed access network using the address of the virtual node corresponding to the respective third party as the destination address;

receiving, from the fixed access network, the data frame with the address of the virtual node as the source address; and providing payload information in the data frame to the protocol stack and the upper application corresponding to the respective third party to which the address of the virtual node corresponds; wherein
- the address is a media access control address,
- the media access control address is specific to the virtual node,
- the fixed access network is a physical access network,
- the respective third party is at least one of a virtual access network and a service provision network, and
- the respective third party is independent of the physical access network.

\* \* \* \* \*